(12) United States Patent
Schafheutle et al.

(10) Patent No.: US 6,359,060 B1
(45) Date of Patent: Mar. 19, 2002

(54) OXIDATIVELY DRYING POLYURETHANE DISPERSIONS

(75) Inventors: Markus A. Schafheutle; Rami-Raimund Awad; Hannelore Gsoell; Birgit Anner, all of Graz; Anton Arzt, Tillmitsch; Martina Glettler, Graz; Andreas Lerch, Fernitz; Gerlinde Petritsch, Graz; Joerg Wango, Wundschuh, all of (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 09/496,492

(22) Filed: Feb. 2, 2000

(30) Foreign Application Priority Data

Feb. 4, 1999 (AT) .................................................. 143/99

(51) Int. Cl.$^7$ ............................. C08J 3/00; C08K 3/20; C08L 75/00; B05D 3/02; B32B 27/40
(52) U.S. Cl. ................. 524/591; 427/372.2; 427/385.5; 428/423.1; 428/425.8; 524/589; 524/590
(58) Field of Search ................................ 524/589, 590, 524/591; 428/423.1, 425.8; 427/372.2, 385.5

(56) References Cited

U.S. PATENT DOCUMENTS 4,277,380 A   7/1981   Williams et al.

FOREIGN PATENT DOCUMENTS

| EP | 0 640 632 A | 3/1995 |
| EP | 0 709 414 A | 5/1996 |

OTHER PUBLICATIONS

Database WPI, 1995, also identified as XP002136917.

*Primary Examiner*—Patrick D. Niland
(74) *Attorney, Agent, or Firm*—Frommer Lawrence & Haug LLP

(57) ABSTRACT

Oxidatively drying aqueous polyurethane dispersions obtainable by reacting drying and/or simidrying oils with low molar mass hydroxy compounds having two or more hydroxyl groups to give compounds containing on average at least one hydroxyl group and at least one radical of a fatty acid having at least one olefinic double bond, then reacting these compounds together with high molar mass polyols, compounds having at least two isocyanate-reactive groups and at least one acid or cation-forming group with polyfunctional isocyanates to give prepolymers having a mass fraction of unreacted isocyanate groups of from 0.1 to 4%, then neutralizing the product and transferring the utilized product to the aqueous phase, a process for preparing them and their use for coating wood.

21 Claims, No Drawings

OXIDATIVELY DRYING POLYURETHANE DISPERSIONS

RELATED APPLICATIONS

This application claims priority to Austrian application No. A 143/99, filed Feb. 4, 1999, herein incorporated by reference.

1. Field of the Invention

In the coating of wood it is common to use moisture curing systems. In many cases such systems contain solvent and also residues of free aromatic isocyanates. This should be avoided for reasons of industrial hygiene.

2. Object of the Invention

An object was, therefore, to develop new wood coating binders which are not cured by means of isocyanates and in which the presence of solvents can be extensively avoided or even done away with altogether.

SUMMARY OF THE INVENTION

A known property of alkyd resins is that they dry oxidatively in air through crosslinking of the double bonds originating from the unsaturated fatty acids. If groups of this kind derived from unsaturated fatty acids are incorporated into polyurethanes, then those polyurethanes can be used to prepare aqueous dispersions which give air-drying coatings.

It has been found that the polyurethane dispersions of this kind are particularly suitable for coating wood.

The invention therefore provides oxidatively drying aqueous polyurethane dispersions obtainable by reacting drying and/or semidrying oils A with low molar mass hydroxy compounds B having two or more hydroxyl groups to give compounds AB, which contains on average at least one hydroxyl group and at least one radical of a fatty acid having at least one olefinic double bond, then reacting the compounds AB together with high molar mass polyols C, compounds D, which have at least two isocyanate-reactive groups and at least one acid group or at least one group which, after neutralisation, forms a cationic group, like, for example, an ammonium group, with polyfunctional isocyanates E to give prepolymers ABCDE having a mass fraction of unreacted isocyanate groups of from about 0.1 to about 4%, based on the mass of the prepolymer. If desired, the prepolymer is then reacted with a compound F, which has an isocyanate-reactive group, followed by neutralizing the product formed with tertiary amines or monofunctional acids G and transferring the utilized product to the aqueous phase, and subsequently, if desired, reacting any excess isocyanate groups still present by adding chain extenders H, which have at least two primary or secondary amino groups or hydrazine groups per molecule.

The invention additionally provides a process for preparing oxidatively drying of aqueous polyurethane dispersions, which comprises, in a first stage a), reacting drying or semidrying oils A having an iodine number of preferably more than about 100 g/(100 g) with low molar mass hydroxy compounds B having two or more hydroxyl groups per molecule. This reaction (trans-esterification) is preferably conducted with alkaline catalysis; particular preference is given to the addition of alkali metal hydroxides in a fraction of from about 5 to about 200 mg, preferably from about 15 to about 100 mg, per 100 g of the mixture of components A and B. The transesterification is preferably conducted at a temperature from about 150 to about 250° C., with particular preference at from about 200 to about 240° C. In the second stage b), this transesterification product AB is introduced as the initial charge; the high molar mass polyol C and, if desired, a further catalyst are added and heated to an elevated temperature of from about 30 to about 100° C., preferably from about 50 to about 80° C. Component D is added subsequently, preferably as a solution in an aprotic solvent such as, for example, N-methylpyrrolidone, and is mixed with the components in the initial charge. Thereafter, the isocyanate component E is added. The mixture is held at the stated reaction temperature until there is no longer any marked change in the isocyanate concentration. Following this step, if desired, a compound F, which is monofunctional with respect to isocyanate, can then be added, preferably in an amount such that the isocyanate groups still present are fully consumed by this reaction. In stage c), this mixture is stirred for from about 10 to about 20 minutes into a solution of the tertiary amine or monofunctional acid G in deionized water (mass fraction of the amine or acid in the water from about 10 to about 40%, preferably from about 20 to about 35%). The solution is at a temperature of from about 50 to about 90° C., preferably from about 70 to about 80° C. If free isocyanate groups are still present in the reaction product, a chain extender H can be added. H preferably contains either two or more primary or secondary amino groups or hydrazine groups and is preferably in the form of an aqueous solution. A chain extension reaction of this kind usually requires an additional reaction time of from about 10 to about 15 minutes. In step d), a dispersion is prepared by the addition of additional water. The dispersion which has a mass fraction of solids of preferably from about 20 to about 40%, with particular preference from about 25 to about 35%.

Finally, the invention also provides for the use of the oxidatively drying aqueous polyurethane dispersions for the preparation of binders to be used for coating wood, plastics, metals and flexible substrates such as leather, paper and card. For the latter utilities, in particular, the combination of high flexibility and high surface hardness, obtainable by using the oxidatively drying aqueous polyurethane dispersions of the invention, is essential.

DESCRIPTION OF THE PREFERRED EMBODIMENTS

Suitable compounds A are the compounds known as drying and semidrying oils, preferably having an iodine number of about 100 g/(100 g) or more. (The iodine number indicates the ratio of the mass of iodine m(I) to the mass of the sample $m_B$ of the unsaturated compound which is able to undergo addition with said mass of iodine, accompanied by decoloring of the iodine solution and consumption of the double bonds; the customary unit of measurement is "g/(100 g)".) Examples of suitable oils are soya oil (120 to 136), safflower oil (140 to 150), linseed oil (155 to 205), sunflower oil (125 to 144), rapeseed oil (105 to 115), castor oil, wood oil, cottonseed oil (109 to 116), and animal oils (the numbers in brackets are in each case the iodine number in g/100 g).

Compounds which can be used as polyols B include dihydric and polyhydric aliphatic hydroxy compounds having, for example, 2 to 12 carbon atoms. Particular preference is given to dihydroxy compounds, such as glycol, 1,2- and 1,3-propylene glycol and 1,4-butanediol, and trihydroxy compounds, such as glycerol and trimethylolpropane and -ethane. Here, polyols having a molar mass of less than about 400 g/mol are referred to as low molar mass polyols. However, it is also possible to use higher alcohols having 4 or more hydroxyl groups, such as ditrimethylolpropane, erythritol and pentaerythritol, sorbitol, mannitol, dipentaerythritol, and sugars such as glucose as well. However, care should be taken to ensure that the functionality of the compounds AB is not too high; it should preferably remain below about 3, with particular preference below about 2.5. This parameter can also be controlled, for example, by using the higher-functional hydroxy compounds in a mixture with diols such as glycol, 1,2- and 1,3-propylene glycol, and oligomeric oxyalkylene glycols, especially oxyethylene glycols having degrees of polymerization of from 2 to 10.

Suitable polyols C are high molar mass polyether polyols, polyester polyols, polycarbonate polyols and polyurethane polyols having a number-average molar mass of about 400 to about 20,000 g/mol, preferably from about 600 to about 15,000 g/mol and, with particular preference, from about 800 to about 10,000 g/mol. They preferably have two hydroxyl groups per molecule. The polyether polyols are derived, for example, from ethylene oxide (oxirane), 1,2-propylene oxide (methyloxirane) and oxacyclopentane (tetrahydrofuran). It is also possible to use mixed polyethers, such as those having blocks of successive oxyethylene units and oxypropylene units. Particular preference is given to those mixed polyether polyols in which the mass fraction of oxyethylene units in the polyether polyol is at least about 20%. Within the context of the invention it is likewise possible to use preferably dihydroxy polyesters which are obtained by condensing low molar mass dihydroxy compounds, preferably aliphatic linear, branched or cyclic diols, with dicarboxylic acids, preferably aliphatic dicarboxylic acids. In part, or almost completely, it is also possible to replace the dihydroxy compounds and the dicarboxylic acids by lactones such as caprolactone. Polycarbonate polyols can be prepared, for example, by ring-opening polyaddition of diols onto cyclic carbonates or else by another known method. By reaction of a substoichiometric amount of diisocyanates and dihydroxy compounds, polyurethane diols are obtained. Both of these can likewise be used for the invention.

Particular preference is given to the use of polyether polyols and polyester polyols, especially the corresponding diols, as component C.

Compounds used as component D are compounds having at least two isocyanate-reactive groups selected from hydroxyl, amino and mercapto groups and acid groups selected from carboxylic acid, sulfonic acid and phosphonic acid groups. Preference is given to compounds having precisely two isocyanate-reactive groups and at least one acid group such as dihydroxy acids, diamino acids and hydroxy amino acids; especially compounds having hydroxyl groups and carboxylic acid groups. In this case, tertiary amines are used as neutralising agents G. In particular, suitable hydroxy carboxylic acids are dimethylolpropionic acid and tartaric acid.

It is also possible to use compounds which, in addition to at least two isocyanate-reactive groups have a functional group which following neutralization leads to a cationic group, e.g., to an ammonium group. Suitable compounds are tertiary amines having two hydroxyl groups or tertiary amines having two primary or secondary amino groups, an example being N-methyldiethanolamine. Neutralizing agents G used in this case are monofunctional acids (e.g., formic, acetic, and lactic acid), or else mineral acids such as, for example, hydrochloric acid.

Compounds used as component E are polyfunctional aliphatic, aromatic and mixed aromatic-aliphatic isocyanates, preference being given to all (cyclo)aliphatic, aromatic or mixed aromatic-aliphatic diisocyanates, as typically used in polyurethane chemistry.

Examples of suitable isocyanates are trimethylene diisocyanate, tetramethylene diisocyanate, pentamethylene diisocyanate, hexamethylene diisocyanate, 1,2-propylene diisocyanate, ethylethylene diisocyanate, 2,3-dimethylethylene diisocyanate, 1-methyltrimethylene diisocyanate, 2-methylpentane 1,5-diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate (TDI), 2,6-tolylene diisocyanate (TDI), 4,4'-biphenylene diisocyanate, 1,5-naphthylene diisocyanate, 1,4-naphthylene diisocyanate, 1-isocyanatomethyl-5-isocyanato-1,3,3-trimethylcyclohexane (IPDI), bis(4-isocyanatocyclohexyl)methane (BICM), 4,4'-diisocyanatodiphenyl ether, 2,3-bis(8-isocyanatooctyl)-4-octyl-5-hexylcyclohexene, the isomeric trimethylhexamethylene diisocyanates, tetramethylxylylene diisocyanate (TMXDI), isocyanurates of above diisocyanates and also allophanates of above diisocyanates. Mixtures of such di- or polyisocyanates can likewise be used. Particular preference is given to TDI, TMXDI, BICM, and IPDI. If chain extension is to be carried out in the aqueous medium, then it is preferred either to use only those isocyanates in which the isocyanate groups are attached to an aliphatic carbon atom or to use a mixture of aromatic and aliphatic isocyanates, the molar amount of hydroxyl groups in components AB, C and D always being greater than the molar amount of the aromatically attached isocyanate groups in E.

Suitable chain terminators F are all compounds having precisely one isocyanate-reactive group or having two or more isocyanate-reactive groups whose reactivity differs greatly. Particular preference is given to compounds having a hydroxyl or primary or secondary amino group, especially (cyclo)aliphatic compounds. Suitable hydroxy compounds are aliphatic linear, branched and cyclic alcohols having, in particular, from 4 to 20 carbon atoms, which can also be unsaturated and can also further include other groups which are not reactive toward isocyanates. Examples of such compounds are the alcohols n-, iso- or sec-butanol, the isomeric hexyl and octyl alcohols, decyl, dodecyl and tridecyl alcohol, and also stearyl alcohol, cyclohexanol, benzyl alcohol, hydroxy esters such as ethylene glycol monoacetate or dipropylene glycol monoacetate, hydroxyethyl acrylate and methacrylate, hydroxypropyl (meth)acrylate and hydroxybutyl (meth)acrylate. Likewise suitable are aliphatic linear, branched and cyclic dialkylamines having 2 to 18 carbon atoms in the alkyl group, such as diethylamine or piperidine, and similar hydroxy amines such as ethanolamine or N,N-diethanolamine.

In the context of this invention the only possible neutralizing agents G are tertiary amines if the compounds D contain acid groups. Preference is given to trialkyl- and trialkanolamines, such as triethylamine, tripropyl- and tributylamine, and triethanolamine.

For the chain extension it is possible as component H to use aliphatic polyamines with and without OH groups. Aliphatic amines having two primary or secondary amino groups are preferred. The diprimary amines which are particularly preferred can also contain further secondary amino groups. Examples of suitable compounds are isophoronediamine (IPDA), ethylenediamine, 1,6-diaminohexane, 1,4-diaminobutane, poly-(iminoalkylene)diamines such as diethylenetriamine (DETA), triethylenetetramine (TETA), tetraethylenepentamine and so on, and reaction products of primary amines and di- or polyepoxides, such as, for example, the reaction product of dimethylaminopropylamine and the bisglycidyl ether of bisphenol A. Other suitable chain extenders are hydrazine or organic bihydrazines or bishydrazides.

It may be necessary to add siccatives (driers) to the coating materials prepared with these dispersions, in order to achieve complete oxidative drying (crosslinking). Suitable siccatives are all those commercially customary siccatives based on cobalt, manganese and other transition metals.

Binders, which are prepared with the oxidatively drying aqueous polyurethane dispersions according to the present invention, are notable for low solvent contents (low VOC levels, volatile organic compounds content) and the possibility of crosslinking at room temperature without an additional, second component. The coatings produced therewith feature high hardness and good scratch resistance, and also, owing to the nature of the crosslinking, possess high resistance to chemicals.

EXAMPLES

The invention is illustrated by the examples below.

Example 1

423 g of linseed oil were mixed with 76 g of glycerol under a nitrogen atmosphere and this mixture was heated to 260° C. with 0.02 g of lithium hydroxide. The material was held at this temperature for 1 hour and then cooled. The cooling process was assisted by adding 418 g of polypropylene glycol (average molar mass 1010 g/mol), 95 g of dimethylolpropionic acid, 0.09 g of dibutyltin dilaurate and 223 g of N-methyl-2-pyrrolidone. Cooling was continued to 70° C., at which point the mixture was held at that temperature until it formed a clear solution. When the solution was clear, 398 g of tolylene diisocyanate followed immediately by 171 g of 4,4'-biscyclohexylmethylene diisocyanate were metered in. The mixture was held at 70° C. until an isocyanate concentration of 3% was reached. This mixture was then added over the course of 10 minutes to a solution at 70° C. of 50.5 g of N,N-dimethylethanolamine and 1798 g of deionized water. Immediately thereafter, a solution of 39 g of triethylenetetramine and 352 g of deionized water was added over the course of 10 minutes to the dispersion. This dispersion was held at 70° C. for one hour more and then cooled. This gave a dispersion having a mass fraction of solids of 33% and a pH of 7.5.

Example 2

423 g of linseed oil were mixed with 76 g of glycerol under a nitrogen atmosphere and this mixture was heated to 260° C. with 0.02 g of lithium hydroxide. The material was held at this temperature for 1 hour and then cooled. The cooling process was assisted by adding 418 g of polypropylene glycol (molar mass 1010 g/mol), 95 g of dimethylolpropionic acid, 0.09 g of dibutyltin dilaurate and 223 g of N-methyl-2-pyrrolidone. Cooling was continued to 70° C., at which point the mixture was held at that temperature until it formed a clear solution. When the solution was clear, 554.5 g of tolylene diisocyanate were metered in. The mixture was held at 70° C. until an isocyanate concentration of 3% was reached. Then 122.7 g of N,N-diethanolamine were added over the course of 5 minutes and the mixture was stirred at 70° C. for 1 hour. Neutralization with 71 g of triethylamine and dispersion with 2584 g of deionized water gave a dispersion having a mass fraction of solids of 36% and a pH of about 7.5.

Example 3 (Comparative example)

146.7 g of polypropylene glycol (average molar mass about 100 g/mol), 11.3 g of 1,2-propylene glycol and 18.2 g of dimethylolpropionic acid were dissolved in 125.3 g of N-methylpyrrolidone, with the addition of about 0.03 g of dibutyltin oxide. At about 70° C. a mixture of technical-grade tolylene diisocyanate (69 g) and 29.6 g of bis(4-isocyanatocyclohexyl)methane with 9.7 g of N-methylpyrrolidone was added and the resulting mixture was stirred at this temperature until the isocyanate group content was constant. 9 g of triethylamine were added over the course of 5 minutes, after which the mixture was diluted with 231.1 g of fully demineralized water. This mixture was stirred into a solution of 5.5 g of triethylenetetramine in 123.2 g of water. This gave a dispersion of a polyurethane resin in water, having a mass fraction of solids of about 36%.

Example 4

423 g of linseed oil were mixed with 76 g of glycerol under a nitrogen atmosphere and this mixture was heated to 260° C. with 0.02 g of lithium hydroxide. The material was held at this temperature for 1 hour and then cooled. The cooling process was assisted by adding 418 g of polypropylene glycol (molar mass 1010 g/mol), 145 g of dimethylolpropionic acid, 0.09 g of dibutyltin dilaurate and 354.6 g of N-methyl-2-pyrrolidone. Cooling was continued to 70° C., at which point the mixture was held at that temperature until it formed a clear solution. When the solution was clear, a mixture of 431.8 g of tolylene diisocyanate and 229 g of bis(4-isocyanatocyclohexyl)methane was metered in. The mixture was held at 70° C. until an isocyanate concentration of 3% was reached. Then 77.1 g of triethylamine were added over the course of 5 minutes and the mixture was stirred at 70° C. for 1 hour. Subsequently, about 3000 ml of fully demineralized water were added and the mixture was stirred at about 75° C. for about 15 minutes. Neutralization with 39 g of triethylenetetramine and addition of a further 560 g of fully demineralized water gave, after stirring for about 15 minutes, a homogeneous dispersion having a mass fraction of solids of about 32% and a pH of about 7.5.

Example 5

100 g of each of the dispersions from Example 3 (Comparative) and 4 were admixed with in each case 0.5 g of a commercial defoamer (®Tego Foamex 805 from Th. Goldschmidt AG, nonionic oil-in-water emulsion of a silica-free polyethersiloxane copolymer having a mass fraction of solids of about 24%) and 0.3 g of a commercial wetting agent (®BYK 346, substrate wetting agent from Byk AG, polyether-modified dimethyl-polysiloxane) and the components were mixed thoroughly to give the clearcoats 5.1 and 5.2. One further such mixture in each case was further admixed with 0.6 g of a siccative based on zirconium salts, cobalt salts and manganese salts (mixture of the octoates; mass ratio Zr:Mn:Co=4.46:1.44:3.12) to give the clearcoats 5.1a and 5.2a.

The following test results were achieved with these coating materials:

| Clearcoat | | 5.1 | 5.1a | 5.2 | 5.2a |
|---|---|---|---|---|---|
| Freedom from tack in min | | 380 | 310 | 180 | 160 |
| Pendulum hardness in s | after 24 h | 21 | 22 | 52 | 65 |
| | after 48 h | 30 | 33 | 63 | 80 |
| | after 7 d | 29 | 30 | 101 | 111 |
| Resistance/glass | in s | | | | |

-continued

| Clearcoat | | 5.1 | 5.1a | 5.2 | 5.2a |
|---|---|---|---|---|---|
| Acetone | | 3 | 7 | 12 | 28 |
| Ethanol | | 14 | 14 | 13 | 60 |
| Resistance/wood | | | | | |
| Acetone | after 10 s | 5 | 5 | 0 | 0 |
| Ethanol | after 1 h | 5 | 5 | 2 | 2 |
| Demin. water | after 16 h | 2 | 1 | 2 | 2 |
| Coffee | after 16 h | 4 | 4 | 3 | 3 |
| Fullness | | 30 | 30 | 25 | 25 |
| Surface hardness | | 40 | 40 | 25 | 20 |
| Yellowing | | 25 | 40 (pink) | 20 | 25 |

The tests on the coatings were conducted as follows:

Freedom from tack:
  Drying recorder, 150 µm wet film thickness on glass strips, drying at 20° C., time reported in minutes until free from tack Pendulum hardness:
  In accordance with König (DIN 53 157), 150 µm wet film thickness on a glass plate, drying at 20° C. for 24 h to 7 d, measurement after the respective drying time Resistances:
  On glass plates: 150 µm wet film thickness, drying at 20° C. for 7 days; the time reported is the time after which the coating is attacked on wiping with a solvent-soaked cotton pad.

On wood:
  Coating twice with a 200 µm wet film thickness each time, drying at 20° C. for 2 weeks in each case, testing in accordance with DIN 68 861 Part 1B with the stated test liquids (evaluation: 0=no visible changes; 1=just perceptible changes in gloss or color; 2=slight changes in gloss or color; structure of the test surfaces is unchanged; 3=severe marking visible, but the structure of the test surface is largely undamaged; 4=severe marking visible, the structure of the test surface is changed; 5=test surface is greatly changed or destroyed)

Fullness, surface hardness:
  Veneered wood, coating twice with 200 µm wet film thickness each time, storage at room temperature (20° C.) for two weeks, assessment by scoring (10=very good; 50=very poor)

Yellowing:
  Coating on veneered maple; 200 µm wet film thickness, storage at room temperature (20° C.) for two weeks, assessment by scoring (1=no noticeable change; 5=very severe discoloration)

The above description of the invention is intended to be illustrated and not limiting. Various changes or modifications in the embodiments described herein may occur to those skilled in the art. Those changes can be made without departing from the scope or spirit of the invention.

What is claimed is:

1. An oxidatively drying polyurethane dispersion obtained by a process comprising:
  a) reacting drying and/or semidrying oils A with low molar mass compounds B, which have two or more hydroxyl groups, to give compounds AB, which contain, on average, at least one hydroxyl group and at least one radical of a fatty acid having at least one olefinic double bond;
  b) reacting the compounds AB, together with high molar mass polyols C, and compounds D, which have at least two isocyanate-reactive groups and at least one acid group or have at least two isocyanate-reactive groups on a functional group that, following neutralization, leads to a cationic group, with polyfunctional isocyanates E to yield prepolymer ABCDE which has a mass fraction from about 0.1 to about 4%, based on the mass of prepolymer, unreacted isocyanate groups;
  c) reacting ABCDE with a chain terminator compound F which has an isocyanate-reactive group and which is selected from the group consisting of n-, iso- or sec-butanol, hexyl alcohol, octyl alcohol, decyl alcohol, dodecyl alcohol, tridecyl alcohol, stearyl alcohol, cyclohexanol, benzyl alcohol, ethylene glycol monoacetate, dipropylene glycol monoacetate, hydroxyethyl acrylate methacrylate, hydroxpropyl (meth)acrylate, hydroxybutyl (meth)acrylate, diethylamine, piperidine, ethanolamine and N,N-diethanolamine;
  d) neutralizing the product obtained above with neutralizing agents G; and
  e) transferring the neutralized product to the aqueous phase.

2. An oxidatively drying aqueous polyurethane dispersion as claimed in claim 1, wherein following the neutralization step excess isocyanate groups still present are reacted by adding chain extenders H, which have at least two primary or secondary amino groups.

3. An oxidatively drying aqueous polyurethane dispersion, as claimed in claim 1, where the mass fraction of isocyanate groups in the prepolymer ABCDE is from 0.1 to 4%, based on the mass of the prepolymer.

4. An oxidatively drying aqueous polyurethane dispersion as claimed in claim 1, wherein polyols B are trihydric polyols selected from glycerol, trimethylolethane and trimethylolpropane.

5. An oxidatively drying aqueous polyurethane dispersion as claimed in claim 1, wherein the high molar mass polyols C are polyether polyols selected from polyethylene glycol and copolymers having oxyethylene and oxypropylene units.

6. An oxidatively drying aqueous polyurethane dispersion as claimed in claim 1, wherein compounds D are dihydroxy acids, diamino acids or hydroxyamino acids.

7. An oxidatively drying aqueous polyurethane dispersion as claimed in claim 1, wherein compounds D have at least two isocyanate-reactive groups and one acid group.

8. An oxidatively drying aqueous polyurethane dispersion as claimed in claim 6, wherein compounds D are dimethylolpropionic acid and tataric acid.

9. An oxidatively drying aqueous polyurethane dispersion as claimed in claim 1, wherein compounds D are compounds which have at least two isocyanate-reactive groups and a functional group which, following neutralization, leads to a cationic group.

10. An oxidatively drying aqueous polyurethane dispersion as claimed in claim 9, wherein compound D is N-methyldiethanolamine.

11. An oxidatively drying aqueous polyurethane dispersion as claimed in claim 1, wherein the isocyanates E are selected from tolylene diisocyanate, tetramethylxylylene diisocyanate, bis(4-isocyanatocyclohexyl)methane, and isophorone diisocyanate.

12. An oxidatively drying aqueous polyurethane dispersion as claimed in claim 2, wherein the chain-extending compounds H are aliphatic polyamines having two primary or secondary amino groups.

13. An oxidatively drying aqueous polyurethane dispersion as claimed in claim 2, wherein the chain-extending compounds H are isophoronediamine (IPDA), ethylenediamine, 1,6-diaminohexane, 1,4-diaminobutane, diethylenetriamine (DETA), triethylenetetramine (TETA), and tetraethylenepentamine.

14. An oxidatively drying aqueous polyurethane dispersion as claimed in claim 1, wherein the compounds A are selected from the group consisting of soya oil, safflower oil, linseed oil, sunflower oil, rapeseed oil, castor oil, wood oil, cottonseed oil, and animal oils.

15. A process for preparing an oxidatively drying aqueous polyurethane dispersion as claimed in claim 1, which comprises the steps of:

a) reacting, under alkaline catalysis, drying or semidrying oils A with low molar mass hydroxy compounds B, which have two or more hydroxyl groups per molecule, to form trans-esterified product AB;

b) mixing product AB, with high molar mass polyol C and the component D followed by the addition of isocyanate component E;

c) reacting ABCDE with a chain terminator compound F which has an isocyanate-reactive group and which is selected from the group consisting of n-, iso- or sec-butanol, hexyl alcohol, octyl alcohol, decyl alcohol, dodecyl alcohol, tridecyl alcohol, stearyl alcohol, cyclohexanol, benzyl, alcohol, ethylene glycol monoacetate, dipropylene glycol monoacetate, hydroxyethyl acrylate methacrylate, hydroxpropyl (meth)acrylate, hydroxybutyl (meth)acrylate, diethylamine, piperidine, ethanolamine and N,N-diethanolamine; and d) stirring the mixture formed in step c) into a warm solution comprising neutralizing agent G with a mass fraction of the neutralizing agent in the water from about 10 to about 40%.

16. A binder which comprises an oxidatively drying polyurethane dispersion as claimed in claim 1.

17. A coating composition which comprises a binder according to claim 16.

18. A substrate which has been coated with a coating composition according to claim 17.

19. The substrate according to claim 18 wherein the substrate is wood, plastic, metal, leather, paper and cardboard.

20. The substrate according to claim 18, wherein the substrate is wood.

21. A method for imparting hardness, scratch resistance, and chemical resistance to a substrate which comprises applying to said substrate a coating composition according to claim 17.

\* \* \* \* \*